United States Patent [19]

Wilson et al.

[11] Patent Number: 5,657,261

[45] Date of Patent: Aug. 12, 1997

[54] INTERPOLATION OF DIGITAL SIGNALS USING SIGNAL SAMPLE REPLICATION

[76] Inventors: Dennis L. Wilson, 1325 Greenwood Ave., Palo Alto, Calif. 94301; M. Campbell Smith, 2545 Crystal Dr., Santa Clara, Calif. 95051

[21] Appl. No.: 422,892

[22] Filed: Apr. 17, 1995

[51] Int. Cl.⁶ .................................................. G06F 17/17
[52] U.S. Cl. .................................. 364/724.1; 341/61
[58] Field of Search .................... 364/723, 724.1, 364/572, 853, 485; 348/538; 315/368.13; 395/2.74; 318/573; 358/428, 525; 371/37.4, 37.5, 37.1, 40.1, 43, 2.2; 341/61

[56] References Cited

U.S. PATENT DOCUMENTS

| | | | |
|---|---|---|---|
| 4,109,110 | 8/1978 | Gingell | 179/15 |
| 4,209,771 | 6/1980 | Miyata et al. | 340/347 |
| 4,270,026 | 5/1981 | Shenoi et al. | 179/15.55 R |
| 4,460,890 | 7/1984 | Busby | 340/347 DD |
| 4,630,034 | 12/1986 | Takahashi | 340/347 |
| 4,903,019 | 2/1990 | Ito | 341/61 |
| 5,075,880 | 12/1991 | Moses et al. | 364/724.1 |
| 5,126,737 | 6/1992 | Torii | 341/61 |
| 5,497,152 | 3/1996 | Wilson | 341/61 |

Primary Examiner—Reba I. Elmore
Assistant Examiner—Steven R. Garland
Attorney, Agent, or Firm—Anthony W. Karambelas

[57] ABSTRACT

A filtering technique that results in improved performance of interpolating filters. The improved filter and technique replicates samples of the digital input signal instead of inserting zeroes before smoothing to eliminate undesired images of the sampled input signal. The filter includes a digital equivalent of a sample and hold for sampling the digital input signal at the input sample rate and for replicating the sampled digital input signal a predetermined number of times to increase the sample rate by an integer multiple and produce replicated samples of the input signal. A smoothing filter is coupled to the digital sample and hold for smoothing the replicated samples. The smoothing filter has a shape having a high frequency enhancement followed by a sharp cutoff that compensates for the replicated samples of the input signal. Interpolated digital output signals are provided therefrom that are at a sample rate higher than the input sample rate.

5 Claims, 4 Drawing Sheets

INTERPOLATION OF DIGITAL SIGNALS USING SIGNAL SAMPLE REPLICATION

BACKGROUND

The present invention relates to interpolating filters, and more particularly, to an interpolating filter and filtering technique that uses signal sample replication in lieu of zero insertion to achieve interpolation of digital signals.

The traditional technique of interpolating digital signals is to increase the sample rate of the digital signals by inserting zero-valued samples between the samples of the signal, then filtering the resulting signal with an interpolating filter. Prior art relating to the present invention is disclosed in the following patents. U.S. Pat. No. 4,109,110 issued to Gingell entitled "Digital-to-Analog Converter" teaches multiplying the sampling rate of a digital signal by repeating the sampled signal the required number of times, with reference to FIG. 6 and the description at col. 4, lines 12–22. The Gingell patent teaches the use of an interpolator as part of a process of increasing the data rate by a large factor for reproducing music from a compact disk, for example. The interpolator can be a simple sample and hold in the digital world according to the patent. There is no suggestion that a smoothing filter to remove the sample and hold artifacts be employed. Gingell does suggest that perhaps a simply constructed linear interpolator be used as being a little better than a sample and hold. The technique of Gingell follows the interpolator by other processing steps that increase the sample rate still farther. The digital to analog converter and the following analog filter are very simple as a result. The use of a filter as part of the interpolator that corrects the sample and hold frequency distortion is not suggested. Since there is no such filter, there is no consideration of the number of bits used in the quantization of the filter coefficients.

U.S. Pat. No. 4,270,026 issued to Shenoi et al. entitled "Interpolator apparatus for Increasing the Word Rate of a Digital Signal of the Type Employed in Digital Telephone Systems". This patent suggests using the traditional inserting of zero value samples to perform the increase in data rate for the digital signal. A recursive digital filter is used as the interpolator. The two pole recursive filter that is suggested will have very much less performance than the finite impulse response filter of the present invention. The present digital filter corrects for the digital sample and hold that I use while achieving the very sharp cutoff. Since this technique does not use a digital sample and hold, but a simple zero insert, there is no need to correct for the distortion, but the following filtering must use more accurate arithmetic. The subject of the Shenoi patent is a technique for implementing the recursive filter easily.

U.S. Pat. No. 5,075,880 issued to Moses et al. entitled "Method and Apparatus for Time Domain Interpolation of Digital Audio Signals" uses a traditional zero insertion technique to increase the sample rate. The filtering is performed by using Lagrangian or spline interpolation from a mathematical technique for interpolation. The patent argues that there is no need to worry about the frequency response of the result, a simple mathematical interpolation operation is good enough. Since there is no filter, there is no consideration of the accuracy of the filter coefficients required to implement the filters.

U.S. Pat. No. 4,209,771 issued to Miyata et at. entitled "Code Converting Method and System" implements a scheme for conversion to a high rate differential pulse code system using ±1 values. The conversion uses the usual DPCM approach of a linearly rising value at a high rate that can reach the value of the digital samples at the sample times. The result is an approximation to a carefully interpolated signal that may be acceptable in some applications. The distortions that occur are well known. As long as the signal changes slowly, the DPCM can keep up with it. When the signal changes rapidly with a large swing, the DPCM approximation will depart from the input signal, causing distortions in the signal and generating spurious frequencies that can cause interchannel interference when there is more than one signal in the bandwidth of the digital samples.

U.S. Pat. No. 5,126,737 issued to Torii entitled "Method for Converting a Digital Signal into Another Digital Signal Having a Different Sampling Frequency" uses interpolating to produce an output sample rate that is nearly the same as the input sample rate. The technique proposed by Torii is to increase the sample rate by a large factor, then downsample to the required rate. The fact that the output samples can drift between the samples even at the very high rate is accounted for by a linear interpolator at the very high rate. The patent suggests using a simple linear interpolation between the two nearest samples. A phase-locked loop is used to determine how far between the two samples the output sample is supposed to occur. The step up to the high sample rate includes the possibility of using a sample and hold. Any technique for producing the high sample rate is acceptable for the purposes of this patent. There is no consideration of the accuracy of the arithmetic involved. There is no consideration of the possibility of correcting for the sample and hold in the filtering process.

U.S. Pat. No. 4,630,034 issued to Takahashi entitled "Sampling Frequency Converting Apparatus" provides a description of a way to change television signals from one format to another. The technique uses a buffering scheme to collect "M" samples of the input, then uses standard digital filtering techniques to produce "N" output samples. The ratio of M/N provides the conversion. The filtering uses large number of sets of coefficients to generate filters that are equivalent to upsampling using zero insertion by a large factor, filtering, then downsampling.

U.S. Pat. No. 4,460,890 issued to Busby entitled "Direct Digital to Digital Sampling Rate Conversion, Method and Apparatus" teaches something similar to Torii and to Moses above. The filters used are simple finite impulse response falters applied to signals whose sample rate is increased by effectively inserting zeroes. The Busby patent suggests interpolating the high sample rate signal with a polynomial interpolator instead of a spline or Lagrangian interpolation. Busby does suggest calculating only those higher rate samples needed in the interpolation of the output points. There is no consideration of the accuracy of the arithmetic used.

U.S. Pat. No. 4,903,019 issued to Ito entitled "Sampling Frequency converter for Converting a Lower Sampling Frequency to a Higher Sampling Frequency and a Method Therefor: suggests using a nearly traditional interpolation technique. Instead of inserting zeroes between samples, this patent suggests inserting zeroes in a block at the end of a group of input samples. The number of zeroes inserted will be those required to pad a block of samples from M samples in the input block to N samples for the output block. The falter uses different sets of coefficients for each of the output points. The patent does not suggest any particular filters, just those that are well known in the industry. The patent does not consider the arithmetic accuracy. The scheme is equivalent to the scheme of inserting zeroes to upsample, then filtering to downsample to the new rate.

Thus, from the above, several of the schemes discloses in the prior art patents use the traditional insert zeroes technique for upsampling before filtering. Others suggest a digital sample and hold that is similar to one used in the present invention. Further, none of the above patents are concerned with a finite impulse response filter with a limited number of bits for coefficients. The accuracy of the arithmetic in the recursive interpolating filter is addressed in the present invention and is not in the prior art patents. The prior art techniques that build a DPCM signal reduce the output to a very low number of bits at a high frequency, but do not consider the accuracy of the arithmetic in interpolating filters that are used in intermediate steps.

Therefore, it is an objective of the present invention to provide for an improved filtering technique that uses signal sample replication with a correction filter in lieu of zero insertion to achieve interpolation of digital signals.

SUMMARY OF THE INVENTION

In order to meet the above and other objectives, the present invention provides for an improved interpolating filter and digital signal interpolation technique that replicates a digital signal a certain number of times, then uses a filter shaped to compensate for the additional samples of the signal. The result is a simpler filter to construct, and an interpolator with improved performance. The present interpolating filter suppresses unwanted images of the interpolated signal more effectively when the filter is implemented with integer arithmetic, and allows a simpler implementation of the interpolating filter with improved performance. The present invention improves upon the ideas outlined in the above-cited prior art patents by tailoring the interpolating filter to correct for frequency roll-off of the digital sample and hold.

More particularly, the present invention is a filtering technique that results in improved performance of interpolating filters. The improved filter and technique replicates samples of the digital input signal instead of inserting zeroes before smoothing to eliminate undesired images of the sampled input signal. The filter includes a digital equivalent of a sample and hold for sampling the digital input signal at the input sample rate and for replicating the sampled digital input signal a predetermined number of times to increase the sample rate by an integer multiple and produce replicated samples of the input signal. A smoothing filter is coupled to the sample and hold for smoothing the replicated samples. The smoothing filter has a shape having a high frequency enhancement followed by a sharp cutoff that compensates for the replicated samples of the input signal. Interpolated digital output signals are provided therefrom that are at a sample rate higher than the input sample rate.

The interpolation filter performs interpolation by replicating samples of the original signal a number of times that is required to increase the sample rate by an integer multiple. This technique is similar to sample and hold techniques that have been used in digital to analog converters, except the technique is applied in the digital domain before converting to the digital signals to analog signals. In the analog domain a smoothing filter follows the sample and hold. It is well known that the smoothing filter must correct for the frequency distortion of the sample and hold by having a frequency characteristic that counterbalances the effective low pass filtering effect of the sample and hold. The smoothing filter employed in the present invention has the required compensating shape, comprising a high frequency enhancement followed by a sharp cutoff. There is an interesting effect in using this technique. Filter coefficients in the digital smoothing filter can be implemented with much less accurate arithmetic. In particular, the filter coefficients can be quantized to eight bits and can achieve the same filtering performance as a traditional interpolation filter using twelve bit filter coefficients when the sample rate is increased by a large amount.

The present invention improves upon the ideas outlined in the prior art patents by tailoring the interpolating filter to correct for frequency roll-off of the sample and hold. Further, the finite impulse response filter is implemented with a limited number of bits for coefficients. The prior art techniques that build a DPCM signal reduce the output to a very low number of bits at a high frequency, but do not consider the accuracy of the arithmetic in interpolating filters that are used in intermediate steps.

The present invention is implemented using large scale integration processing chips that include circuits that are organized for filtering. Typically, these chips have a large number of multipliers. A chip from LSI Logic that is used in a reduced to practice embodiment of the present invention has 64 multipliers with associated adders that are used to implement the filter. With 64 multipliers, inserting zeroes wastes the multiplication performed by associated multipliers. In the present filter, all multipliers are used. Further, the integrated circuit chip is organized with limited coefficient accuracy of eight bits. To achieve more accuracy requires coupling of several chips together. Thus, the present invention uses resources of the filter chip most effectively in building a high performance filter for interpolating to a higher sample rate. In particular, side-lobes of the filter are reduced three dB for every doubling the number of times the samples are replicated in the digital sample and hold. Very flat filters with sharp cutoffs and low out-of-band frequency response are achieved using the present invention.

This disclosure proposes an interpolating filter which changes the sampling rate of a digital signal by repeating the previous sampled signal the required number of times. The disclosure contrasts its approach to the prior art procedure of increasing the sampling rate by inserting the required number of "zeroes".

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1A:
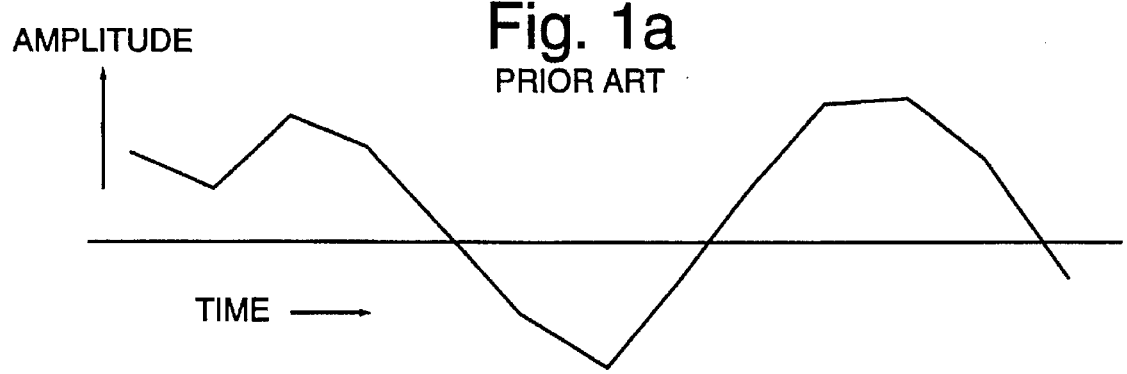
FIGS. 1a and 1b show how a digital signal may have its sample rate increased by an integer multiple by adding zeros between signal samples in accordance with prior art techniques.
Figure 1B:
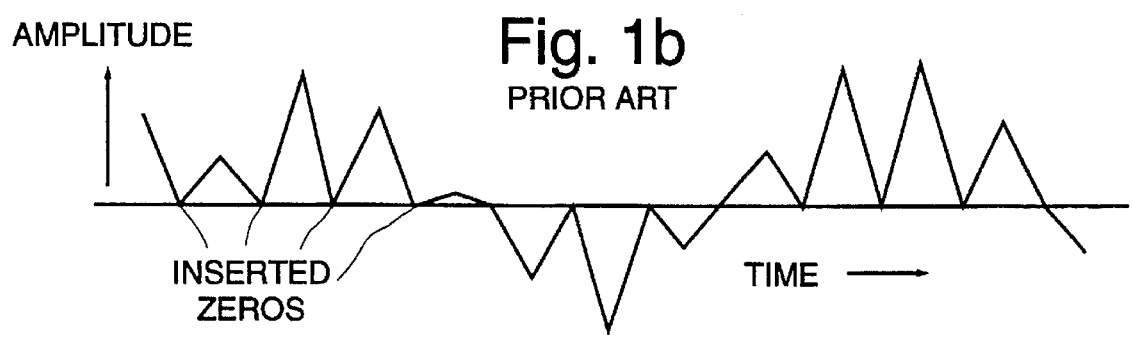

Referring to the drawing figures, and by way of introduction, the classical technique of increasing the sample rate of a digital signal by an integer multiple is to insert a number of zeroes after each sample of the signal. The approach is shown in FIGS. 1a and 1b. For example, if the signal sample rate is to be increased by a factor of two, one zero is inserted after each sample. The resulting signal spectrum has images of the signal spaced in frequency at distances equal to the original sample rate. Since the new sample rate is at a multiple of the original sample rate, the images constitute unwanted signals in the signal spectrum.

Figure 2A:
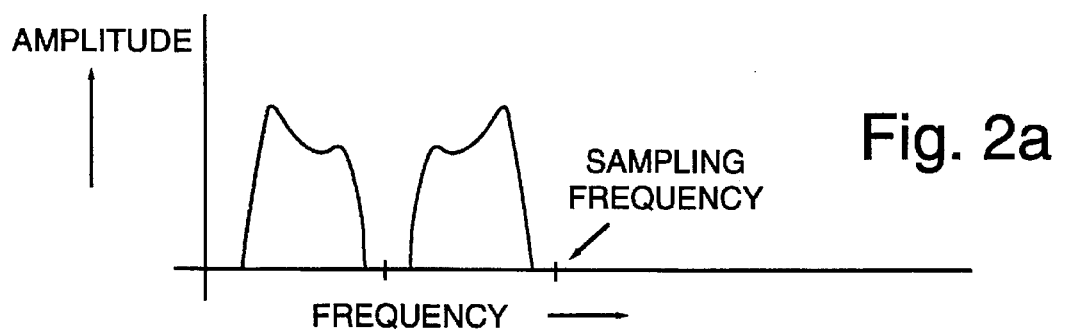
FIGS. 2a and 2b show a typical spectrum of the upsampled signal with images.
Figure 2B:
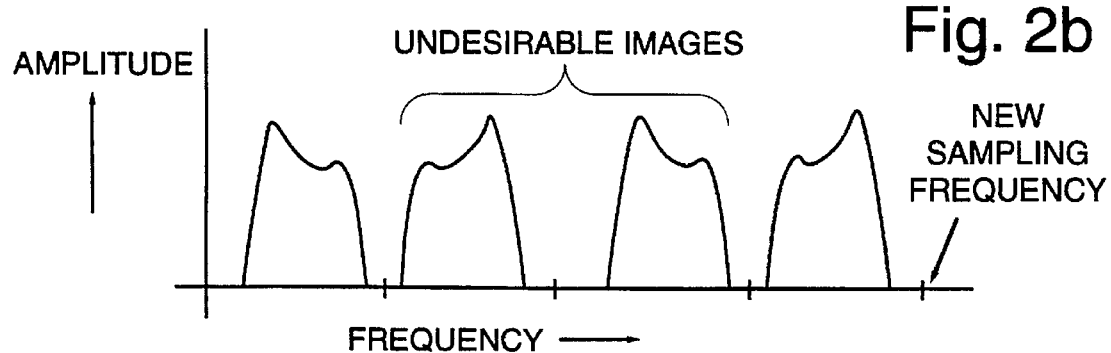
Figure 3:
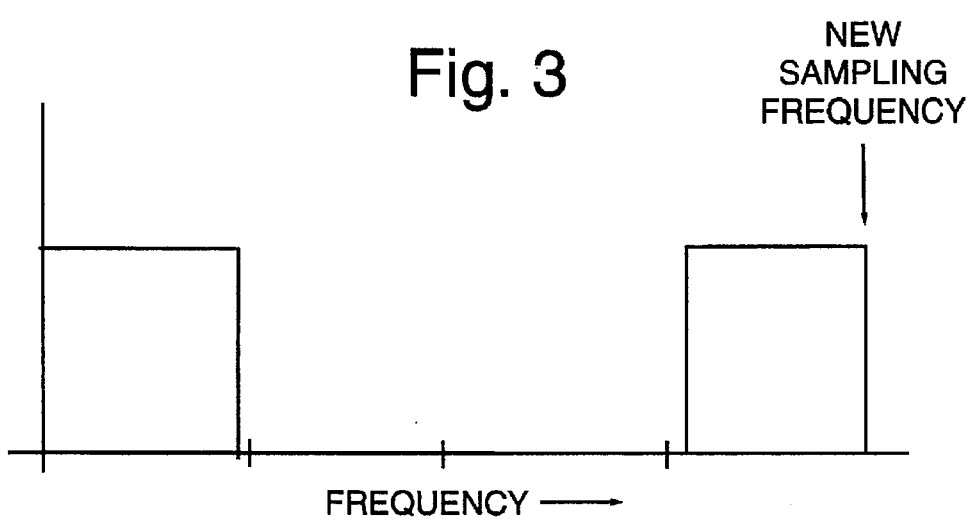
FIG. 3 shows the bandpass characteristic of an interpolating filter that will remove the images of the signal shown in FIG. 2b.
Figure 4:
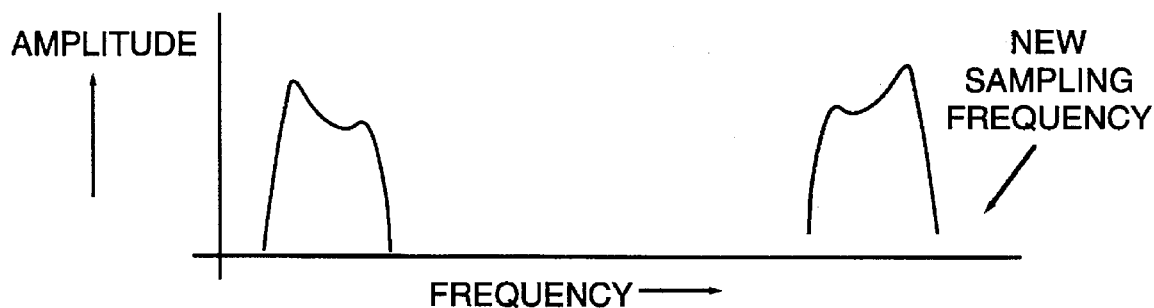
FIG. 4 shows the spectrum of the filtered signal of FIG. 3 with the images removed.
Figure 5:
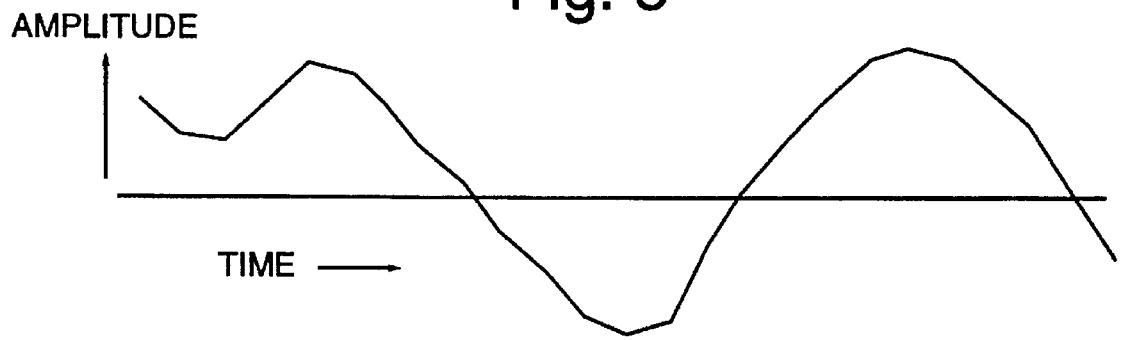
FIG. 5 shows how the interpolating filter smoothes the sampled waveform, calculating the values of intermediate samples.

FIGS. 2a and 2b show a typical spectrum of an upsampled signal with images. FIG. 3 shows the bandpass characteristic of a filter that will remove the images of the signal shown in FIG. 2b. FIG. 4 shows the spectrum of the filtered signal with the images removed. The effect of the filter in the time domain is shown in FIG. 5. The filter calculates values for intermediate samples between the samples of the original signal, filling in the zeroes of the upsampled signal.

When a interpolating filter is implemented in hardware that performs integer arithmetic, several problems arise. Limited capabilities of the arithmetic results in inaccuracies in computations of the filter outputs, and consequently of the interpolated signal. The digitized signal is represented by a set of integer values depending on the accuracy of the original analog-to-digital converter. Typically the signal is quantized with eight bits, ten bits, or twelve bits. Some video converters, for example, use as few as six bits. The signal values that can be represented will depend on the number of bits in the signal. For example, an eight bit signal will have values between −128 and +127. A ten bit signal will have values between −512 and +511. A typical representation of the signal value will be a "2s complement" integer.

Figure 6:
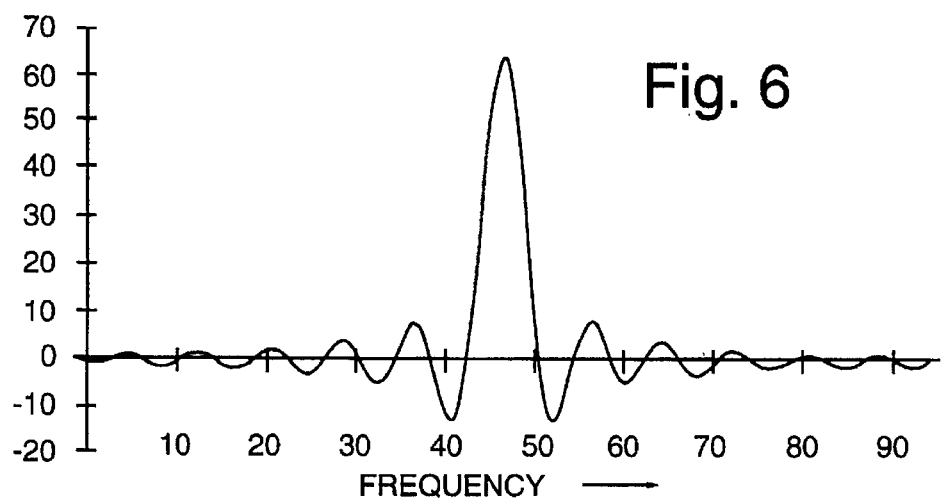
FIG. 6 shows the impulse response of a filter used to eliminate undesired images.
Figure 7:
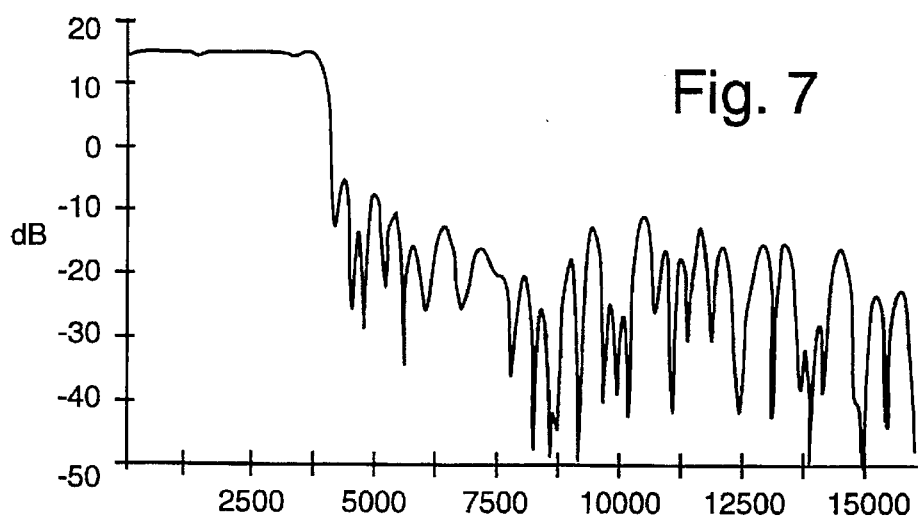
FIG. 7 shows the frequency response of a filter of FIG. 6 which is useful in understanding the present invention.

As a concrete example of an interpolating filter application, consider a telephone voice signal with a passband from 300 to 3700 Hz. These signals are traditionally sampled at 8000 Hz. If it is desired to increase the sample rate to 32000 Hz, a filter is required to eliminate the images between 4 kHz and 28 kHz. FIG. 6 shows the impulse response of a suitable filter that has a flat frequency response over the range from zero to 3700 Hz. The frequency response of this filter is shown in FIG. 7. The impulse response has values that are integers at the sample points and that may be represented as eight bit numbers.

When the integer value of the signal is multiplied by the integer value of the filter coefficient, a number is formed that has a number of bits that is equal to the sum of the number of bits in the number and the number of bits in the coefficient. In order to establish the gain of the system at a selected value, typically 1.0, the numbers are divided by a selected integer and the fractional part is discarded by rounding the result. Rounding of the coefficients to form integers for the filter implementation limits the performance of the filter.

As shall be described below with reference to the present invention, performance is improved when interpolation is performed by replicating each sample instead of inserting zeroes. A different filter is required to compensate for the different implementation of the interpolation process. As an additional advantage, the replication of samples using the present invention is easier to perform compared to inserting zeroes.

Figure 8:
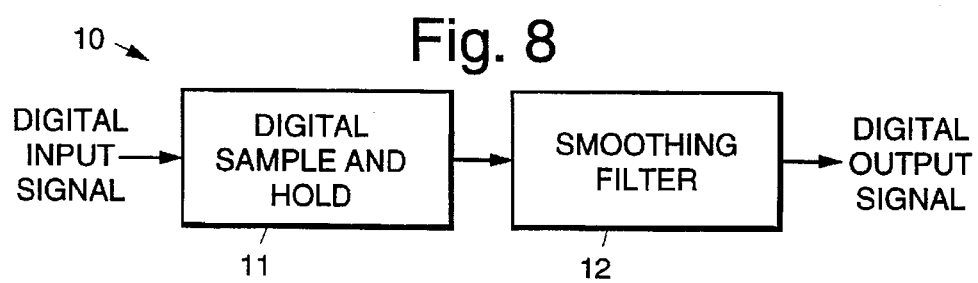
FIG. 8 shows a schematic diagram of the interpolating filter.
Figure 8A:
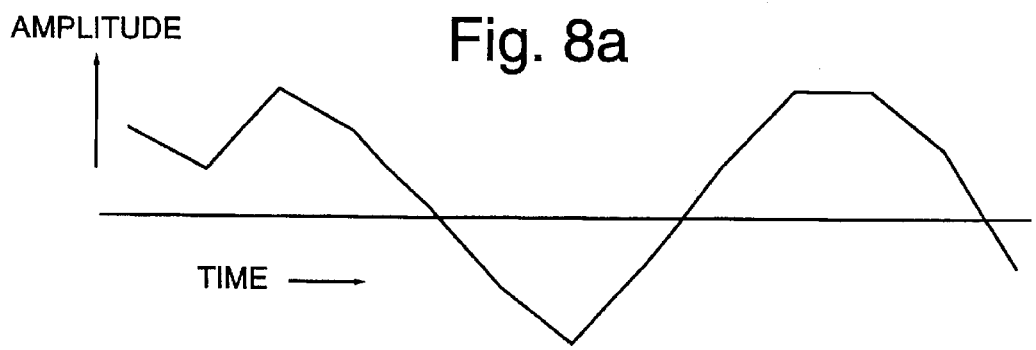
FIGS. 8a and 8b show increasing the sample rate of a digital signal by replicating the samples in accordance with the principles of the present invention.
Figure 8B:
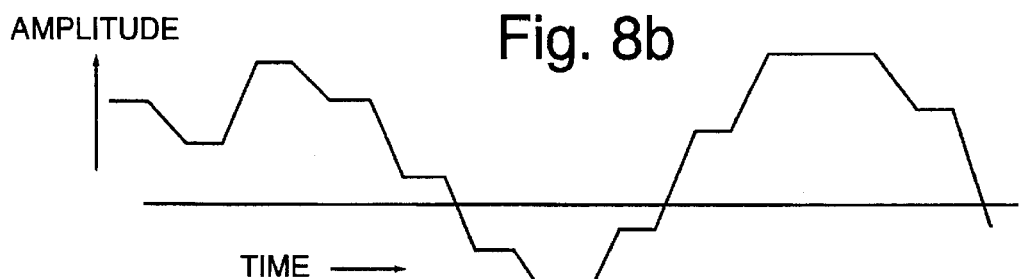

Given the above background, an improved interpolating filter 10 in accordance with the present invention will now be described. FIG. 8 shows a schematic diagram of the interpolating filter 10. FIGS. 8a and 8b illustrate the technique that is used to increase the sample rate in accordance with the principles of the present invention. The interpolating filter 10 is used to interpolate to a sample rate that is higher than an input sample rate of the digital input signal. The interpolating filter 10 includes replicating means 11 comprising a sample and hold circuit 11 for sampling the digital input signal and replicating it digitally a predetermined number of times to increase the sample rate by an integer. This produces replicated samples of the input signal. A smoothing filter 12 is coupled to the replicating means 11 (sample and hold circuit 11) for receiving the replicated samples. The smoothing filter 12 has a shape with a high frequency enhancement followed by a sharp cutoff that compensates for the replicated samples of the signal. The smoothing filter 12 providing interpolated digital output signals therefrom that are at a sample rate higher than the input sample rate.

Each sample of the digital input signal is replicated a requisite number of times, instead of inserting zeroes. This has the effect of producing a digital "sample and hold" of the signal. The sampled signal changes in steps instead of comprising a collection of pulses. In filtering theory, it is known that a sample and hold or boxcar filter has a sin(x/x) frequency response. The response rolls off at higher frequencies, distorting the shape of the signal.

In accordance with the present invention, by building the interpolating filter 10 with a response that increases in frequency before the cut-off frequency is reached, the roll-off of the sin x/x filter may be corrected. This produces a frequency response for the entire interpolation process that is flat through the passband of the filter 10. The same performance in the passband may be achieved as for the conventional filter that processes the signal with inserted zero value samples. As is described below, the performance of the filter 10 in the stop band is considerably improved. In addition, the present filter 10 with replicated samples is easier to build, since the circuits that perform the sample and hold operation are much simpler than circuits that insert zeroes.

Figure 9:
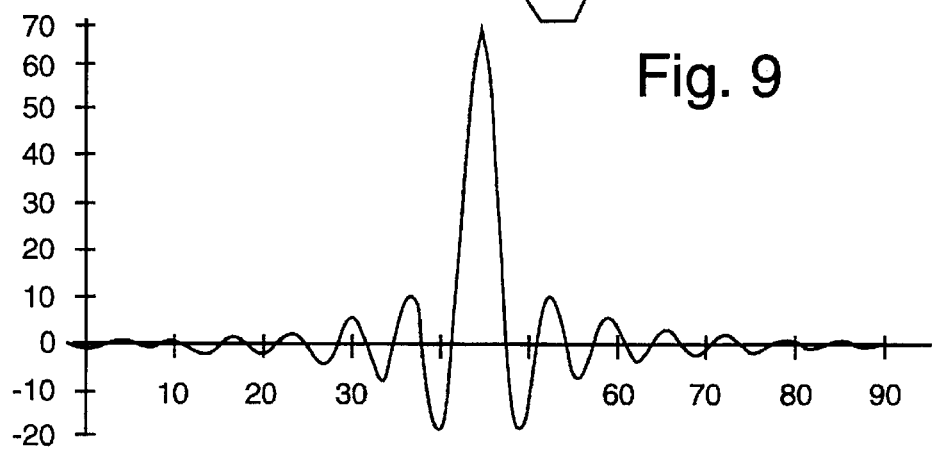
FIG. 9 shows the impulse response of the filter of the present invention.
Figure 10:
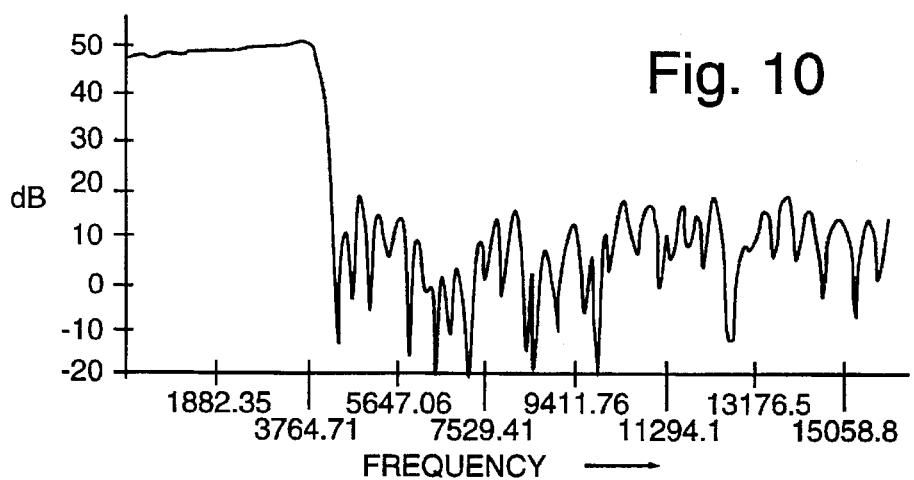
FIG. 10 shows the frequency response of the filter of the present invention.
Figure 11:
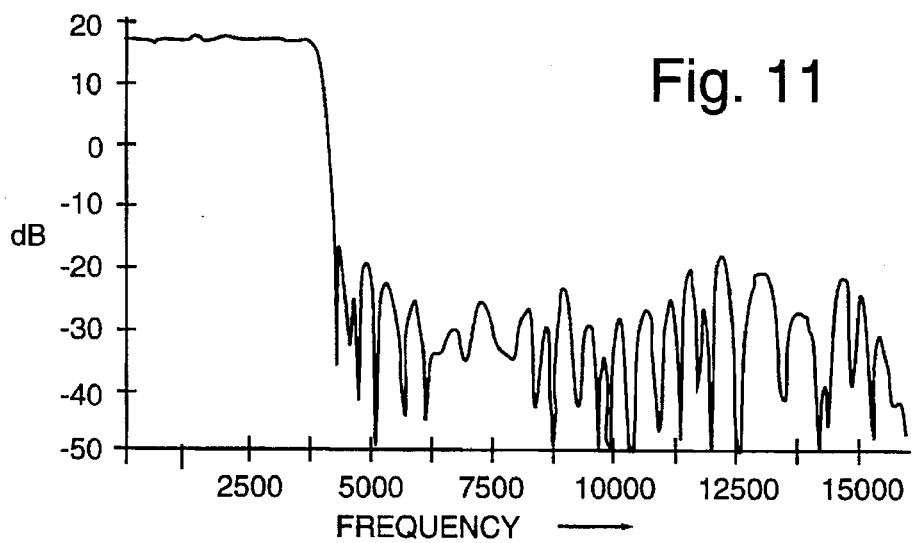
FIG. 11 shows the composite filter frequency response of the filter of the present invention.

By way of example, FIG. 9 shows the impulse response of a filter 10 that may be used to interpolate a signal to increase the sample rate by a factor of four. The frequency response of the filter 10 of FIG. 9 is shown in FIG. 10. In this example, the sample rate is 8000 samples per second. The new sample rate is 8000*4=32000 samples per second. In this example, the signal is a telephone voice signal with a passband from 300 to 3700 Hz with the signal down by 40 dB at 4000 Hz, suitable for digitization at 8000 samples per second. The interpolating filter 10 is a low pass filter that is flat +0.2 dB to 3700 Hz. The filter rolls off to more than 40 dB down by 4300 Hz for the interpolated signal in order to eliminate the image that appears at 4300 Hz.

The effect of replicating the Samples four times instead of inserting three zeroes is to increase the energy in the signal that is filtered by a factor of four. A factor of four provides a total of 12 dB greater effective signal power. At the same time, the sidelobe level of the filter has not changed. The result is that the present filtering technique has increased the image rejection power of the filter 10 by 12 dB over an implementation that uses inserted zeroes.

The interpolation filter 10 may be generated using well-known techniques available from several sources. The filters 10 used as examples herein were generated using techniques described in a book by T. W. Parks and C. S. Burrus, entitled "Digital Filter Design", John Wiley and Sons, Inc. New York, 1987. The filters described in the present specification are low pass filters 10, but the present technique is equally applicable to bandpass filters 10, or to filters 10 of any arbitrary shape. The filters 10 need only be tilted up at the high frequency end of the spectrum to account for the roll-off due to the replication of the samples.

The present interpolating filter 10 and technique is useful in the implementation of a system where signals at a number of different sample frequencies are to be resampled at a single frequency for output through a digital-to-analog converter. It is useful, but not required, for the sample frequency (rate) to be a power of two different from the output sample frequency (rate). Any integer ratio between the input sample frequency and the output sample frequency may be used. As is traditionally done in the digital signal domain, an artificial sample frequency may be used that is an integer multiple of both the input sample rate and the output sample rate. In this situation, the output samples are calculated only at the samples of the output sample rate, eliminating the samples at the artificial sample rate that are not needed at the output. In this manner, a signal may be upsampled to a sample rate that is not a simple integer multiple of the input sample rate.

Thus, an interpolating filter and filtering technique that uses signal sample replication in lieu of zero insertion to achieve interpolation of digital signals have been described. The improved filter replicates samples instead of inserting zeroes before filtering to eliminate undesired images of the signal. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. An interpolating filter for interpolating an digital input signal sampled at a input sample rate to an output sample rate that is higher than the input sample rate, said filter comprising:

replicating means replicating the sampled digital input signal a predetermined number of times to increase the sample rate by an integer multiple and produce replicated samples of the input signal; and a smoothing filter coupled to the replicating means for receiving the replicated samples, and wherein the smoothing filter has a shape comprising a high frequency enhancement followed by a sharp cutoff that compensates for the replicated samples of the signal, and for providing interpolated digital output signals therefrom that are at a sample rate higher than the input sample rate.

2. The interpolating filter of claim 1 wherein the replicating means comprises a sample and hold circuit.

3. The interpolating filter of claim 1 wherein the input sample rate is a power of two different from the output sample rate.

4. A method of interpolating an digital input signal sampled at a input sample rate to an output sample rate that is higher than the input sample rate, said method comprising the steps of:

sampling the digital input signal at the input sample rate;

replicating the sampled digital input signal a predetermined number of times to increase the sample rate by an integer multiple and produce replicated samples of the input signal; and smoothing the replicated samples using a smoothing filter having a shape comprising a high frequency enhancement followed by a sharp cutoff to compensate for the replicated samples, and provide interpolated digital output signals therefrom that are at a sample rate higher than the input sample rate.

5. The method of claim 4 wherein the input sample rate is a power of two different from the output sample rate.

* * * * *